(12) United States Patent
Seto

(10) Patent No.: US 6,587,040 B2
(45) Date of Patent: Jul. 1, 2003

(54) EMERGENCY CALL SYSTEM PROVIDED WITH THEFTPROOF FUNCTION

(75) Inventor: Hitoshi Seto, Tokyo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 0 days.

(21) Appl. No.: 09/760,772

(22) Filed: Jan. 17, 2001

(65) Prior Publication Data

US 2001/0002815 A1 Jun. 7, 2001

Related U.S. Application Data

(63) Continuation of application No. PCT/JP99/02588, filed on May 18, 1999.

(51) Int. Cl.[7] .............................................. B60R 25/10
(52) U.S. Cl. ........................ 340/426.1; 340/426.12; 340/426.19; 340/989; 701/1; 307/10.2
(58) Field of Search ................................. 340/426, 988, 340/989, 990, 991, 992, 993, 995, 996, 428, 429, 430, 426.1; 701/1, 35; 307/10.2, 10.3, 10.4

(56) References Cited

U.S. PATENT DOCUMENTS

| | | | | |
|---|---|---|---|---|
| 5,463,372 A | * | 10/1995 | Mawyer, Sr. ............... | 180/287 |
| 5,497,149 A | * | 3/1996 | Fast ............................ | 340/988 |
| 5,515,285 A | * | 5/1996 | Garrett, Sr. et al. ......... | 340/426 |
| 5,519,255 A | * | 5/1996 | Burtch et al. ............... | 180/287 |
| 5,557,254 A | * | 9/1996 | Johnson et al. .............. | 340/426 |
| 5,673,305 A | * | 9/1997 | Ross ........................... | 340/426 |
| 5,682,133 A | * | 10/1997 | Johnson et al. .............. | 340/426 |
| 6,028,537 A | * | 2/2000 | Suman et al. ............... | 340/988 |
| 6,067,007 A | * | 5/2000 | Gioia .......................... | 340/426 |
| 6,166,627 A | * | 12/2000 | Reeley ........................ | 340/426 |
| 6,233,506 B1 | * | 5/2001 | Obradovich et al. ........... | 701/1 |
| 6,278,921 B1 | * | 8/2001 | Harrison et al. .............. | 701/35 |

FOREIGN PATENT DOCUMENTS

| JP | 62-11694 | 1/1987 |
|---|---|---|
| JP | 2-279448 | 11/1990 |

* cited by examiner

*Primary Examiner*—Nina Tong
(74) *Attorney, Agent, or Firm*—Sughrue Mion, PLLC

(57) ABSTRACT

An emergency call system is provided in which an arithmetic and control unit sets a drive mode or a theft prevention mode in a vehicle, in accordance with an instruction provided from a HELP center or a portable phone of an authorized user via a data transmission unit, or provided locally via an operation interface, and in which a determination as to occurrence of a theft is made accurately under the control of the arithmetic and control unit on the basis of a current vehicle location obtained via a GPS reception/gyro sensor unit, verification of an ID of a user, frequency of trials for verification of the ID, status of a door of the vehicle, and time that elapses while the door remains closed.

3 Claims, 2 Drawing Sheets

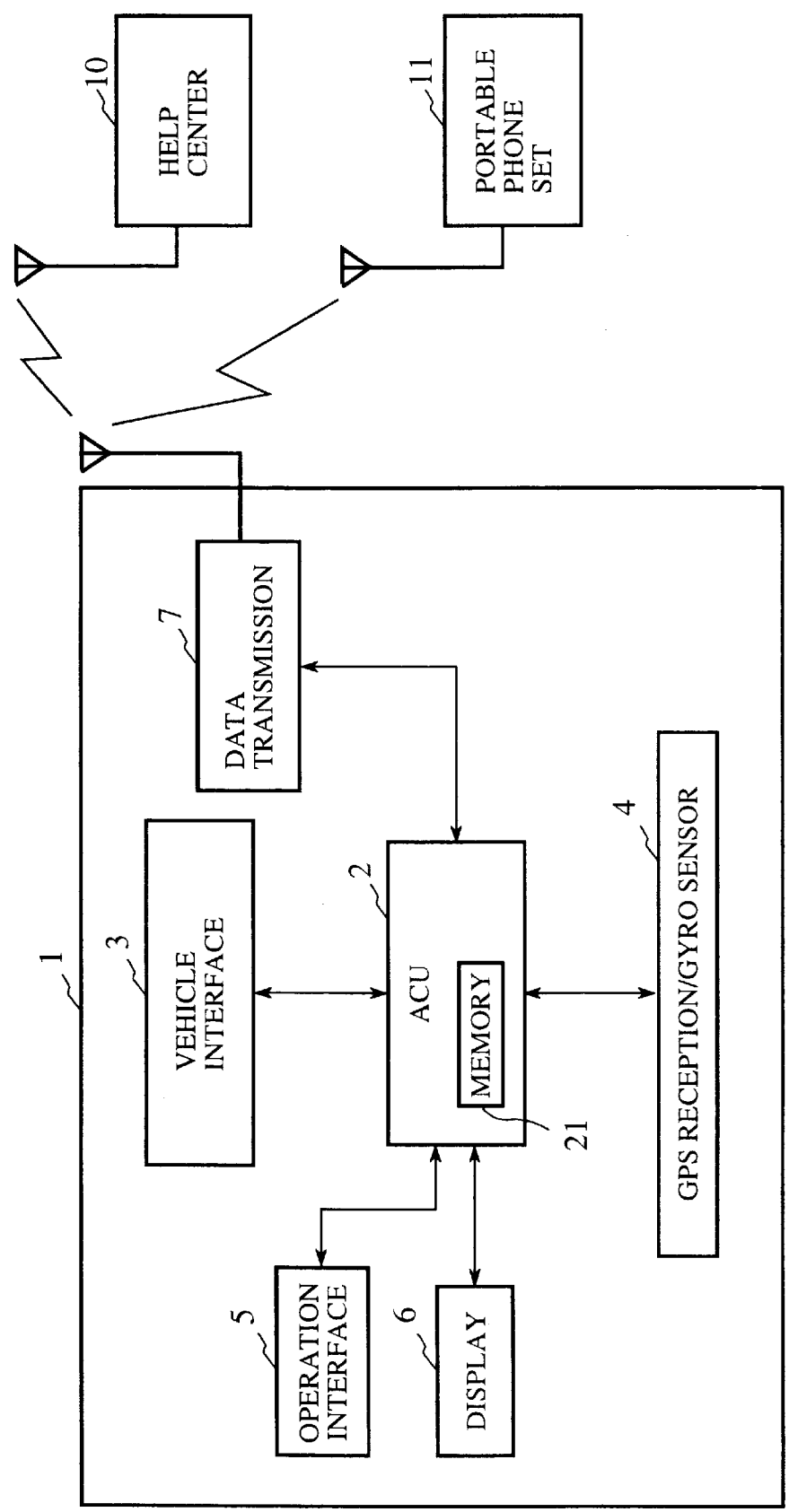

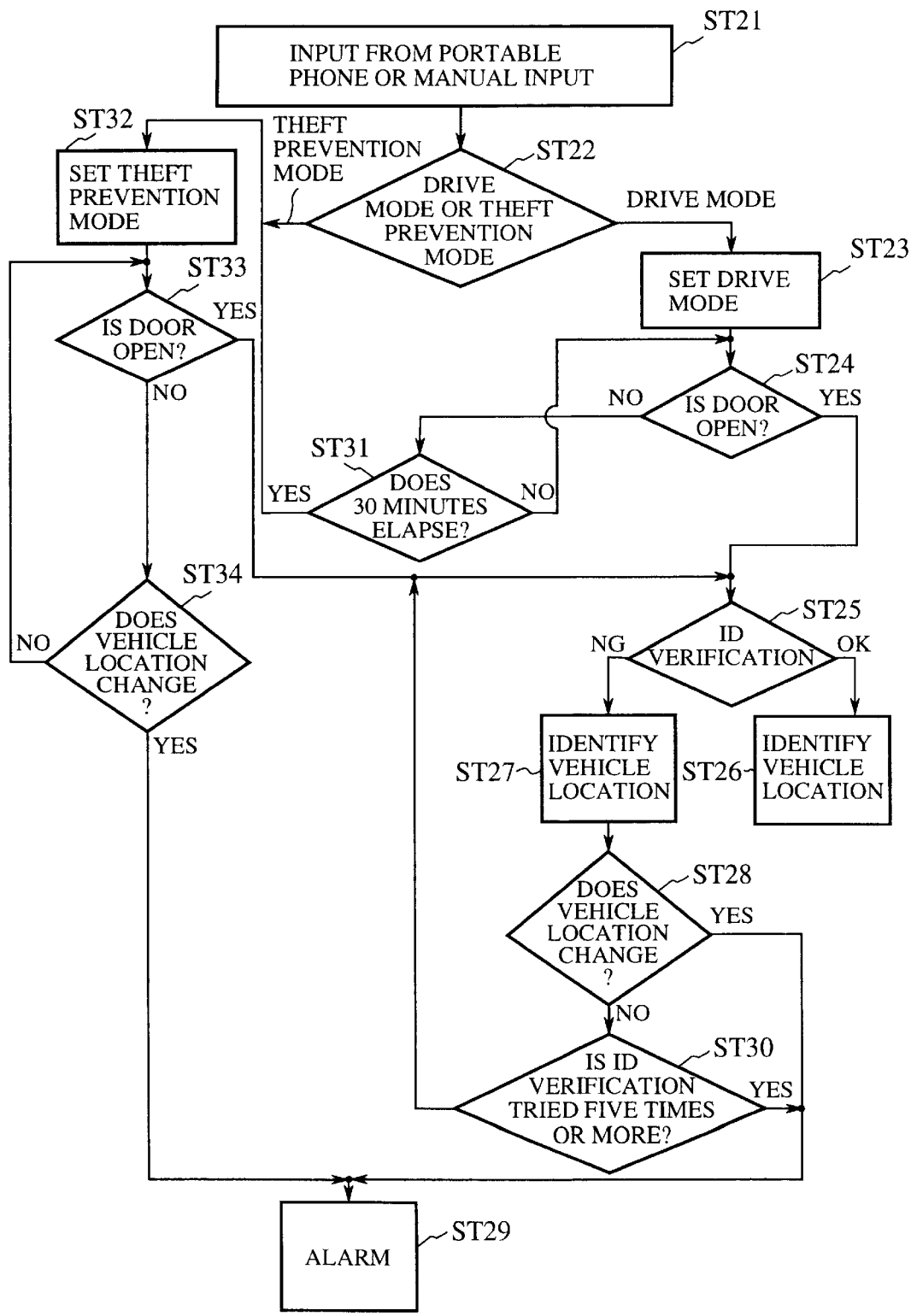

EMERGENCY CALL SYSTEM PROVIDED WITH THEFTPROOF FUNCTION

CROSS-REFERENCE TO THE RELATED APPLICATION

This Application is a continuation of International Application No. PCT/JP99/02588, whose International filing date is May 18, 1999, the disclosures of which Application are incorporated by reference herein.

BACKGROUND OF THE INVENTION

1. Field of the Invention

The present invention generally relates to emergency call systems and, particularly, to an emergency call system (EMCS) provided with a theftproof function for detecting illegal use of a vehicle by an unauthorized user or occurrence of a vehicle theft, and delivering accurate, related information to an authorized user or a HELP center when the vehicle is stolen.

2. Description of the Related Art

According to the related-art approach, vehicle theft prevention may be implemented by a vehicle driving license card apparatus wherein vehicle theft is prevented by authorizing vehicle driving only when an IC card, provided with an integrated circuit memory storing driving license information related to an authorized user of a vehicle, is properly read by a verifying means provided in the vehicle. In an alternative approach, vehicle theft is prevented by a vehicle theft preventing apparatus in which a code provided by an unauthorized user trying to start an engine of a vehicle with a key is compared with a registered secret code associated with the key. If it is determined as a result of comparison that an authenticate key is not used to start the engine, a determination is made that the vehicle is being stolen. An alarm may be sounded or a lamp is made to flash before the engine is automatically stopped.

However, in the vehicle theft preventing apparatus according to the related art, it is difficult to differentiate accurately between an emergency state in which a theft or the like has occurred and a normal state. It is also difficult to determine whether an authorized user is trying to use the vehicle. Consequently, the related-art apparatuses often end up delivering a false message to a HELP center. Accordingly, a relatively heavy load is imposed on the HELP center processing false messages.

SUMMARY OF THE INVENTION

Accordingly, a general object of the present invention is to provide an emergency call system provided with a theftproof function in which the aforementioned drawbacks are eliminated.

Another and more specific object of the invention is to provide an emergency call system provided with a theftproof function in which a frequency of false emergency messages indicating a theft or the like is reduced so that the HELP center is relieved of a load of processing false messages.

The aforementioned objects can be achieved by an emergency call system comprising: a vehicle interface unit for receiving inputs of a vehicle speed pulse indicating a speed of a vehicle and signals including a status signal indicating a status of a key of the vehicle; a data transmission unit for transmitting information indicating a status of the vehicle to one of a HELP center provided outside the vehicle and a registered portable phone, and for receiving a control signal transmitted from one of the HELP center and the registered portable phone to set a status of the vehicle; a GPS reception and gyro sensor unit for detecting a current vehicle location; an operation interface for locally receiving the control signal for setting the status of the vehicle; a display unit for displaying the status of the vehicle; an arithmetic and control unit connected to the vehicle interface unit, the data transmission unit, the operation interface, the display unit and the GPS reception and gyro sensor unit, and provided with a memory for storing a program or data controlling the vehicle interface unit, the data transmission unit, the operation interface, the display unit and the GPS reception and gyro sensor unit, wherein the arithmetic control unit receives the control signal via one of the data transmission unit and the operation interface so as to set one of a drive mode and a theft prevention mode in the vehicle, accordingly checks an ID of a user, a frequency of trials for verifying the ID, a current vehicle location and a status of a door of the vehicle, and generates information related to the theft when it is determined that the vehicle is stolen, thus sending the information to one of the HELP center and the portable phone via the data transmission unit and displaying the information in the display unit.

The arithmetic and control unit in the drive mode may verify the ID when the door of the vehicle is open and execute the steps of: detecting a current vehicle location via the GPS reception and gyro sensor unit when the ID is successfully verified so as to store the detected current vehicle location; detecting the current vehicle location via the GPS reception and gyro sensor unit when the ID is not verified, thus determining, when there is a difference between data relating to a previous vehicle location stored in the memory and data relating to the current vehicle location, that the vehicle is stolen, and stores, when there is no difference, the data relating to the current vehicle location in the memory; and counting the frequency of trials for verifying the ID and determining, when the count exceeds a predetermined level, that the vehicle is stolen so as to notify one of the HELP center and the portable phone accordingly via the data transmission unit; wherein the arithmetic and control unit in the theft prevention mode determines that the vehicle is stolen, when the door of the vehicle is closed and when there is a difference between the data relating to the current vehicle location detected via the GPS reception and gyro sensor unit and the data relating to the previous vehicle location stored in the memory, so as to notify one of the HELP center and the portable phone accordingly via the data transmission unit; and wherein the arithmetic and control unit in the theft prevention mode verifies the ID when the door of the vehicle is open, and executes the steps of: detecting a current vehicle location via the GPS reception and gyro sensor unit when the ID is successfully verified so as to store the detected current vehicle location; detecting the current vehicle location via the GPS reception and gyro sensor unit when the ID is not verified, thus determining, when there is a difference between data relating to a previous vehicle location stored in the memory and data relating to the current vehicle location, that the vehicle is stolen, and stores, when there is no difference, the data relating to the current vehicle location in the memory; and counting the frequency of trials for verifying the ID and determining, when the count exceeds a predetermined level, that the vehicle is stolen so as to notify one of the HELP center and the portable phone accordingly via the data transmission unit.

BRIEF DESCRIPTION OF THE DRAWINGS

Other objects and further features of the present invention will be apparent from the following detailed description when read in conjunction with the accompanying drawings, in which:

FIG. 1 is a block diagram showing a theftproof emergency call system and related elements according to an embodiment of the present invention; and FIG. 2 is a flowchart showing an operation of an arithmetic and control unit in the theftproof emergency call system shown in FIG. 1.

DETAILED DESCRIPTION OF THE PREFERRED EMBODIMENTS

FIG. 1 is a block diagram showing a theftproof emergency call system and related elements according to an embodiment of the present invention. Reference numeral 1 indicates an emergency call system provided in a vehicle and provided with a theftproof function; and reference numeral 2 indicates an arithmetic and control unit provided with a memory 21. The memory 21 stores a program and control data for operating the arithmetic and control unit 2. The operation of the arithmetic and control unit 2 will be described with reference to FIG. 2.

Reference numeral 3 indicates a vehicle interface unit for receiving a control signal indicating whether a key of the vehicle enters a key slot, a pulse signal indicating a speed of the vehicle and a control signal from an air bag. The vehicle interface unit 3 outputs these signals to the arithmetic and control unit 2. The vehicle interface unit 3 also receives a control signal output from the arithmetic and control unit 2 to control vehicle facilities such as an alarm.

Reference numeral 4 indicates a Global Positioning System reception/gyro sensor unit provided with a GPS system for estimating a current location of the vehicle using a radio wave from a gyro satellite. The GPS reception/gyro sensor unit 4 may share a GPS receiver with a navigation apparatus of the vehicle. Reference numeral 5 indicates an operation interface for accepting an instruction from an authorized user to control the theftproof emergency call system; and reference numeral 6 indicates a display unit operated under the control of the arithmetic and control unit 2 to display various types of information to a driver and passengers of the vehicle. The display unit 6 may be a liquid crystal monitor. A monitor of the navigation apparatus may be used as the display unit 6.

Reference numeral 7 indicates a data transmission unit for transmitting emergency information, relating to a theft of the vehicle or the like and generated in the arithmetic and control unit 2, to a HELP center 10, a portable phone of the authorized user or a registered portable phone.

The HELP center 10 receives the emergency information from the theftproof emergency call system 1. When the received information indicates occurrence of vehicle theft, the HELP center 10 notifies the portable phone of the authorized user or the police. Reference numeral 11 indicates a portable phone of the authorized user or the registered portable phone. The portable phone 11 receives the emergency information indicating a vehicle theft or the like from the emergency call system 1 or outputs a control signal for setting a mode of the vehicle to the emergency call system 1.

A description will now be given of the operation according to the present invention.

FIG. 2 is a flowchart showing an operation of the arithmetic and control unit 2 in the emergency call system 1 shown in FIG. 1. The operation of the arithmetic and control unit 2 described in the following is programmed and stored in a memory 21 together with the control data.

In the theftproof emergency call system according to the present invention, two modes including a drive mode and a theft prevention mode are provided in order to reduce the frequency of false messages being sent to the HELP center 10 or the authorized user of the vehicle.

The drive mode is a state in which the authorized user is driving the vehicle. The theft prevention mode is a state other than the drive mode. For example, the theft prevention mode is set when the authorized user leaves the vehicle.

A description will be given of the operation performed when the drive mode is set in the theftproof emergency call system 1.

The drive mode is set inside the vehicle via the operation interface 5 or set externally via the portable phone 11 of the authorized user or the HELP center 10 (step ST22).

When the drive mode is set (step ST23), a check is made as to whether the door is open (step ST24). If it is determined that the door is open, ID verification is performed to determine if the authorized user is using the vehicle (step ST25).

In the ID verification in step ST25, the user is prompted for input of an ID code. The user inputs an ID number or a secret number on a touch panel implementing the display unit 6, or introduces an IC card or a magnetic card into a card reader (not shown) in the emergency call system 1 for verification of the ID.

If it is verified that the authorized user is using the vehicle as a result of the ID verification, the current vehicle location is obtained via the GPS reception/gyro sensor unit 4 and the data relating to the current vehicle location is stored in the memory 21.

If it is determined as a result of the ID verification in step ST25 that an unauthorized user is using the vehicle, control is turned to step ST27, wherein the current location of the vehicle is identified as in step ST26.

Subsequently, in step ST28, data relating to a previous vehicle location is compared with the data relating to the current vehicle location. If it is determined as a result of comparison that an upward, downward, forward or backward change in the vehicle position has occurred or the vehicle has moved to a distance location, the arithmetic and control unit 2 determines that the vehicle is stolen. The arithmetic and control unit 2 then generates theft information and sends the information to the HELP center 10, the portable phone 11 of the authorized user or the registered portable phone 11, via the data transmission unit 7. An alarm (not shown) in the vehicle may be sounded to announce that the vehicle has been stolen.

If it is determined in step ST28 that the position of the vehicle has not changed, control is turned to step ST30. In step ST30, the frequency of ID verification trials in step ST25 is identified and, if it is found that the ID verification is tried five times or more, a determination is made that the vehicle has been stolen, whereupon control is turned to step ST29. In step ST29, a message is output to notify the occurrence of theft. The frequency of ID verification trials may be set as desired. The message is output as already described above. More specifically, the arithmetic and control unit 2 generates message data and sends the message to the HELP center 10, the portable phone 11 of the authorized user or the registered portable phone 11, via the data transmission unit 7. Optionally, the alarm (not shown) in the vehicle is sounded so as to announce that the vehicle has been stolen.

A description will now be given of the operation performed when the theft prevention mode is set in the theftproof emergency call system 1 provided in the vehicle.

In step ST21, when designation of the theft prevention mode is input to the emergency call system 1 via the operation interface 5 or the portable phone 11 of the authorized user so that the theft prevention mode is set in step ST22, control is turned to step ST32. When it is determined in step ST31, which is executed when a determination that the door is closed is yielded in step ST24, the door remains not open for 30 minutes since the setting of the drive mode in step ST23, control is also turned to step ST32. In step ST32, the vehicle is set up for the theft prevention mode.

In step ST33, a check is made as to whether the door is open. If it is determined that the door is not open, control is turned to step ST34. In step ST34, the data relating to the previous vehicle location stored in the memory 21 is compared with the data relating to the current vehicle location. If it is determined as a result of the comparison that the vehicle position has changed, a determination is made that the vehicle has been stolen. Thereupon, the arithmetic and control unit 2 generates emergency message data and sends the same to the HELP center 10, the portable phone 11 of the authorized user, or the like via the data transmission unit 7. The alarm in the vehicle (not shown) may be sounded so as to announce that the vehicle has been stolen.

If it is determined in step ST34 that the vehicle position has not changed, control is returned to step ST33.

In the theftproof emergency call system according to the embodiment described above, the engine is driven only when the ID verification is successful in the drive mode (step ST25).

Release of the drive mode or the theft prevention mode is effected via the portable phone 11 of the authorized user or the operation interface 5 in the vehicle. The ID verification for verifying the authenticity of the user is not omitted.

It is assumed in step ST30 that the ID verification may be tried at least four times before turning control to a subsequent step. However, the number of times that the ID verification may be tried may be selected as desired in step ST31 described above, a determination is made as to whether a period of 30 minutes elapses while the door remains not open. However, the determination may be made based on a different period of time.

As has been described, according to the embodiment described above, the theftproof emergency call system allows the drive mode or the theft prevention mode to be set in the vehicle. A determination as to the occurrence of a vehicle theft or the like is made based on the vehicle location data, authenticity of the user, ID verification, number of times that the ID verification is tried, status of the door and a period of time that elapses while the door remains closed. Therefore, even when the vehicle is stolen by being elevated by a crane or the like and moved elsewhere without the engine thereof being started, the HELP center 10 or the authorized user of the vehicle is accurately informed of the event. An additional advantage of the invention is that, since the frequency of false messages being sent to the HELP center 10 is reduced according to the invention, the HELP center is relieved of a load of processing false messages.

The present invention is not limited to the above described embodiment, and variations and modifications may be made without departing from the scope of the present invention.

What is claimed is:

1. A theft detection and reporting system for a vehicle, comprising:
   a vehicle interface unit;
   a data transmission unit for receiving a control signal transmitted from a remote location and for transmitting data to a remote location;
   a GPS unit for detecting a current vehicle location;
   an operation interface for locally receiving the control signal from a user;
   a display unit for displaying the status of the vehicle; and
   an arithmetic and control unit connected to said vehicle interface unit, said data transmission unit, said operation interface, said display unit and said GPS unit, and provided with a memory for storing a program or data for controlling said vehicle interface unit, said data transmission unit, said operation interface, said display unit and said GPS unit,
   wherein said arithmetic and control unit obtains vehicle status information via the vehicle interface unit;
   wherein said arithmetic and control unit receives said control signal via one of said data transmission unit and said operation interface so as to set one of a normal driving mode and a theft prevention mode in the vehicle, and performs a check of one or more of an ID of a user, a number of ID verification attempts by the user, a current vehicle location and a status of a door of the vehicle based on the set mode, and generates information indicating a theft when it is determined that the vehicle is stolen using the results of the performed checks, said arithmetic control unit further operating to send said information to one of a HELP center and a pre-registered phone via said data transmission unit when it is determined that said vehicle is stolen;
   wherein when in the normal driving mode:
      said arithmetic and control unit verifies the user ID when the door of the vehicle has been opened;
      said arithmetic and control unit detects a current vehicle location via said GPS unit when the ID verification is successful so as to store the detected vehicle location;
      said arithmetic and control unit detects the current vehicle location via said GPS unit when the ID verification is not successful, thus determining, when there is a difference between a previous vehicle location stored in the memory, and the current vehicle location, that the vehicle is stolen, and stores, when there is no difference, the current vehicle location in the memory;
      said arithmetic and control unit counts the number of ID verification attempts; and
      said arithmetic and control unit determines, when said count of the number of ID verification attempts exceeds a predetermined level, that the vehicle is stolen; and
   wherein when in the theft prevention mode:
      said arithmetic and control unit verifies the ID when the door of the vehicle has been opened;
      said arithmetic and control unit detects a current vehicle location via said GPS unit when the ID verification is successful so as to store the detected vehicle location;
      said arithmetic and control unit detects the current vehicle location via said GPS unit when the ID verification is not successful, thus determining, when there is a difference between a previous vehicle location stored in the memory and the current vehicle location, that the vehicle is stolen, and stores, when there is no difference, the data relating to the current vehicle location in the memory;
      said arithmetic and control unit counts the number of ID verification attempts; and
      said arithmetic and control unit determines, when the count exceeds a predetermined level, that the vehicle is stolen.

2. A theft detection and reporting system for a vehicle, comprising:
   a vehicle interface unit;
   a data transmission unit for receiving a control signal transmitted from a remote location and for transmitting data to a remote location;
   a GPS unit for detecting a current vehicle location;
   an operation interface for locally receiving the control signal from a user;

a display unit for displaying the status of the vehicle;

an arithmetic and control unit connected to said vehicle interface unit, said data transmission unit, said operation interface, said display unit and said GPS unit, and provided with a memory for storing a program or data for controlling said vehicle interface unit, said data transmission unit, said operation interface, said display unit and said GPS unit, a verification means for verifying the user ID when the door of the vehicle has been opened;

a detection means;

a counter means for counting the number of ID verification attempts; and a determination means for determining, when the count exceeds a predetermined level, that the vehicle is stolen, wherein said arithmetic and control unit obtains vehicle status information via the vehicle interface unit;

wherein said arithmetic and control unit receives said control signal via one of said data transmission unit and said operation interface so as to set one of a normal driving mode and a theft prevention mode in the vehicle, and performs a check of one or more of an ID of a user, a number of ID verification attempts by the user, a current vehicle location and a status of a door of the vehicle based on the set mode, and generates information indicating a theft when it is determined that the vehicle is stolen using the results of the performed checks, said arithmetic control unit further operating to send said information to one of a HELP center and a pre-registered phone via said data transmission unit when it is determined that said vehicle is stolen;

wherein when in the normal driving mode, said detection means detects a current vehicle location via said GPS unit when the ID verification is successful so as to store the detected vehicle location, and for detecting the current vehicle location via said GPS unit when the ID verification is not successful, thus determining, when there is a difference between a previous vehicle location stored in the memory, and the current vehicle location, that the vehicle is stolen, and stores, when there is no difference, the current vehicle location in the memory; and wherein when in the theft prevention mode, said detection means detects a current vehicle location via said GPS unit when the ID verification is successful so as to store the detected vehicle location, and detects the current vehicle location via said GPS unit when the ID verification is not successful or the door remains closed, thus determining, when there is a difference between a previous vehicle location stored in the memory and the current vehicle location, that the vehicle is stolen, and stores, when there is no difference, the data relating to the current vehicle location in the memory.

3. A theft detection and reporting system for a vehicle, comprising:

a vehicle interface unit;

a data transmission unit for receiving a control signal transmitted from a remote location and for transmitting data to a remote location;

a GPS unit for detecting a current vehicle location;

an operation interface for locally receiving the control signal from a user;

a display unit for displaying the status of the vehicle; and an arithmetic and control unit connected to said vehicle interface unit, said data transmission unit, said operation interface, said display unit and said GPS unit, and provided with a memory for storing a program or data for controlling said vehicle interface unit, said data transmission unit, said operation interface, said display unit and said GPS unit, wherein said arithmetic and control unit obtains vehicle status information via the vehicle interface unit;

wherein said arithmetic and control unit receives said control signal via one of said data transmission unit and said operation interface so as to set one of a normal driving mode and a theft prevention mode in the vehicle, and performs a check of one or more of an ID of a user, a number of ID verification attempts by the user, a current vehicle location and a status of a door of the vehicle based on the set mode, and generates information indicating a theft when it is determined that the vehicle is stolen using the results of the performed checks, said arithmetic control unit further operating to send said information to one of a HELP center and a pre-registered phone via said data transmission unit when it is determined that said vehicle is stolen;

wherein when in the normal driving mode:

said arithmetic and control unit detects the current vehicle location via said GPS unit when the door of the vehicle has not been opened, thus determining, when there is a difference between a previous vehicle location stored in the memory and the current vehicle location, that the vehicle is stolen;

said arithmetic and control unit verifies the user ID when the door of the vehicle has been opened;

said arithmetic and control unit detects a current vehicle location via said GPS unit when the ID verification is successful so as to store the detected vehicle location;

said arithmetic and control unit detects the current vehicle location via said GPS unit when the ID verification is not successful, thus determining, when there is a difference between a previous vehicle location stored in the memory, and the current vehicle location, that the vehicle is stolen, and stores, when there is no difference, the current vehicle location in the memory;

said arithmetic and control unit counts the number of ID verification attempts; and said arithmetic and control unit determines, when said count of the number of ID verification attempts exceeds a predetermined level, that the vehicle is stolen; and wherein when in the theft prevention mode:

said arithmetic and control unit verifies the ID when the door of the vehicle has been opened;

said arithmetic and control unit detects a current vehicle location via said GPS unit when the ID verification is successful so as to store the detected vehicle location;

said arithmetic and control unit detects the current vehicle location via said GPS unit when the ID verification is not successful, thus determining, when there is a difference between a previous vehicle location stored in the memory and the current vehicle location, that the vehicle is stolen, and stores, when there is no difference, the data relating to the current vehicle location in the memory;

said arithmetic and control unit counts the number of ID verification attempts; and said arithmetic and control unit determines, when the count exceeds a predetermined level, that the vehicle is stolen.

* * * * *